Patented May 23, 1939

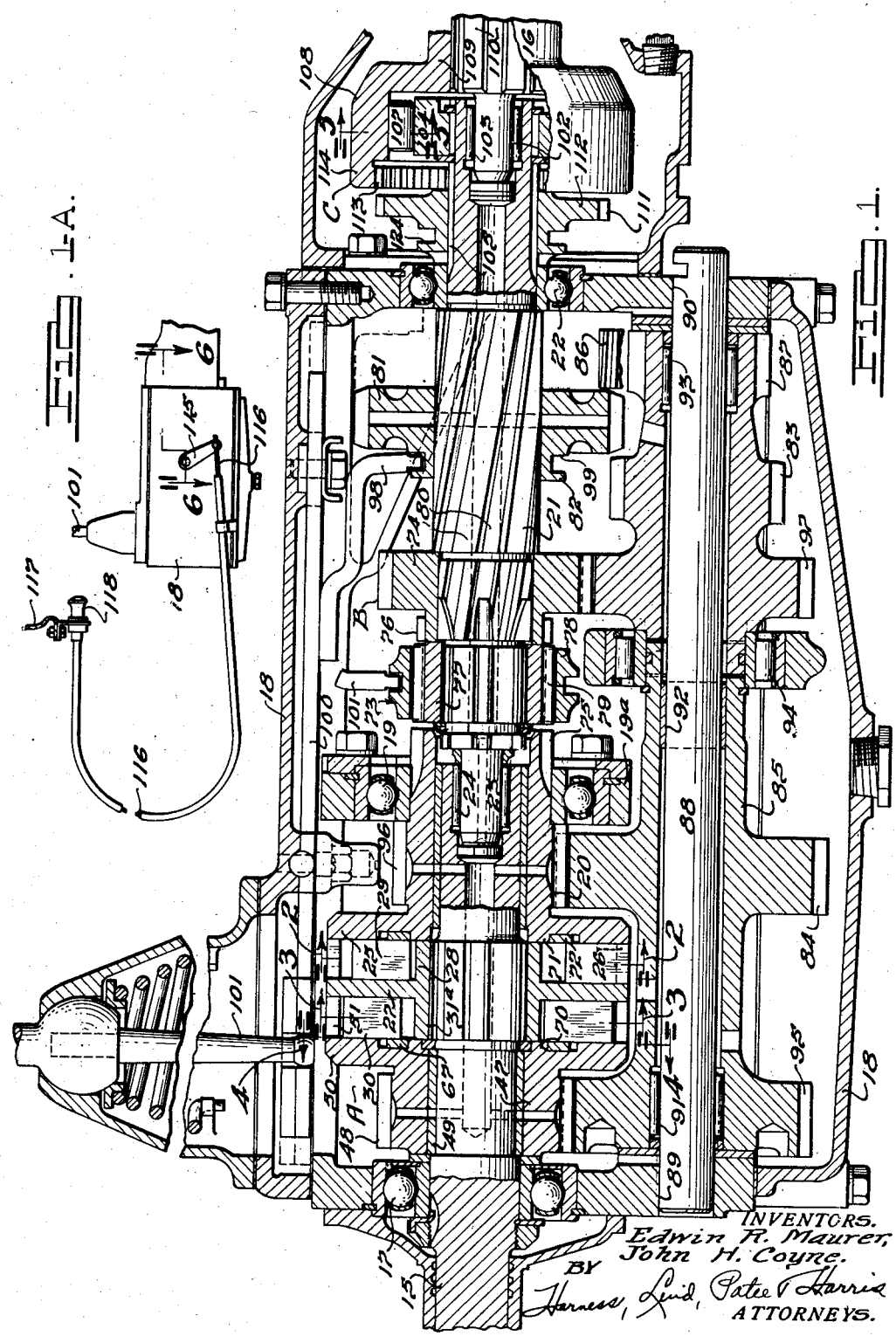

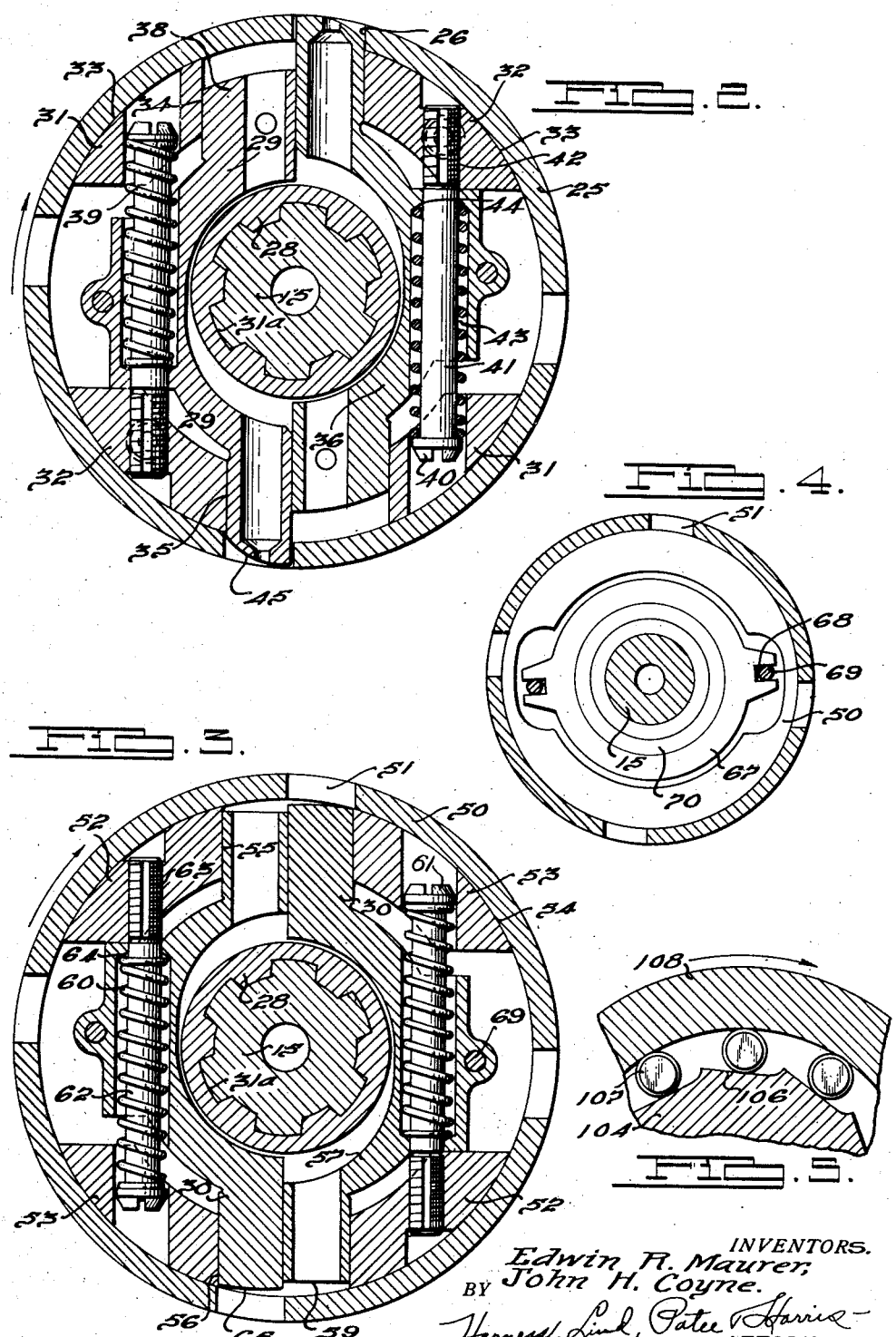

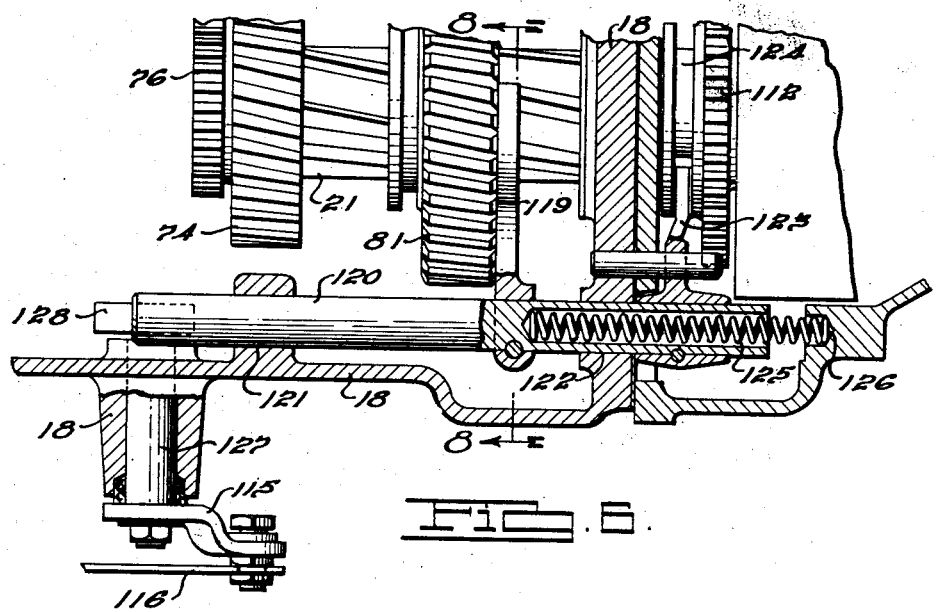
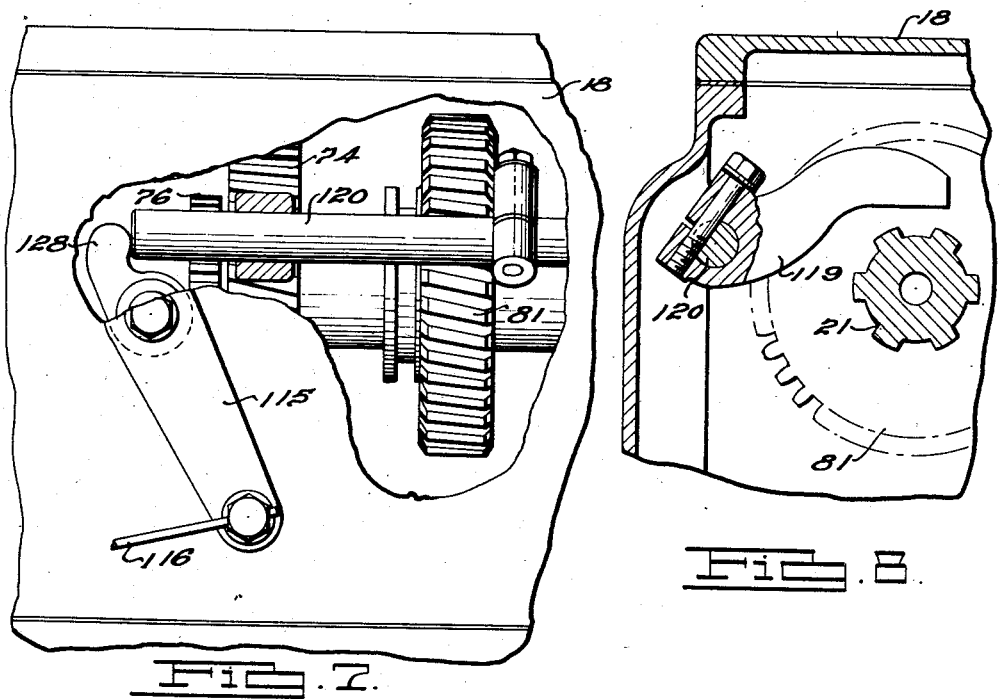

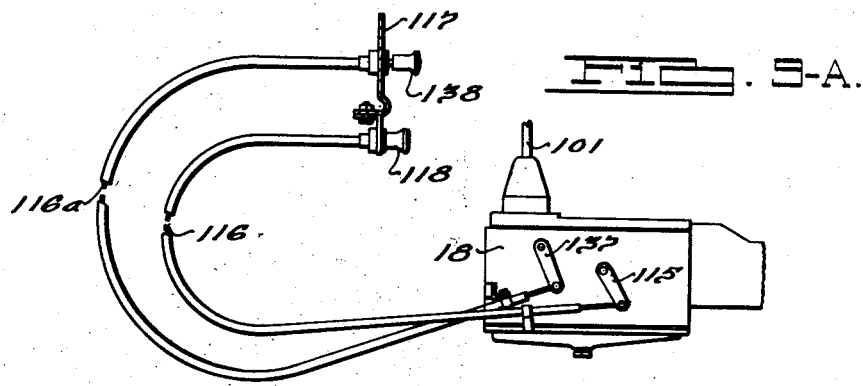
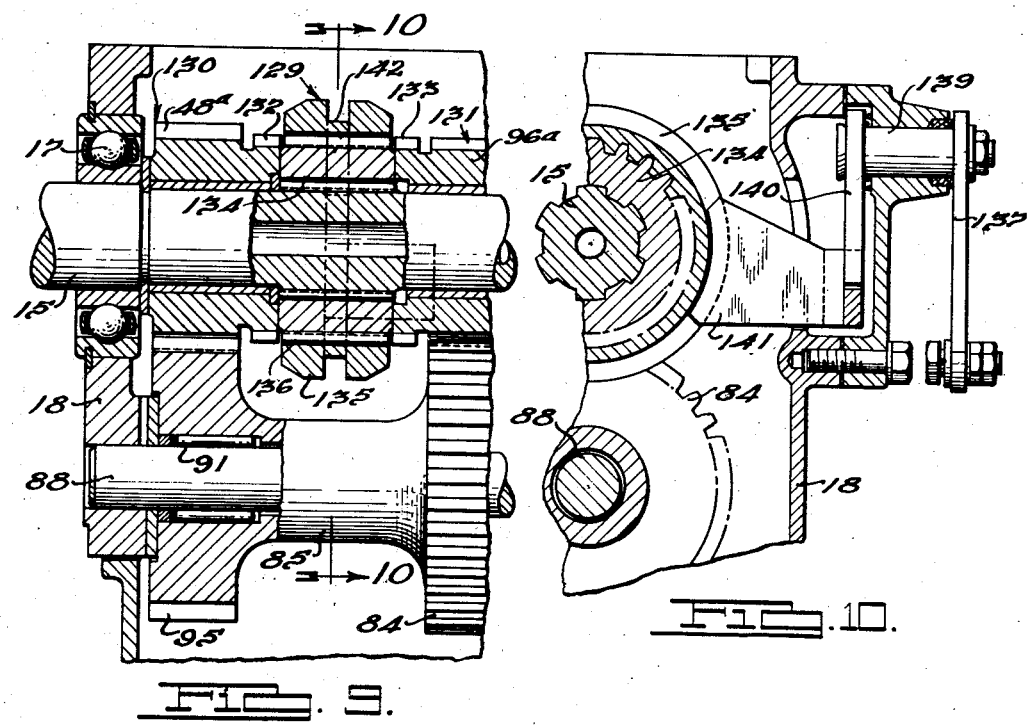

2,159,442

UNITED STATES PATENT OFFICE 2,159,442

POWER TRANSMISSION

Edwin R. Maurer, Detroit, and John H. Coyne, Highland Park, Mich., assignors to Chrysler Corporation, Highland Park, Mich., a corporation of Delaware Application June 18, 1936, Serial No. 85,828

20 Claims. (Cl. 74—336)

This invention relates to power transmissions and refers more particularly to improvements in transmissions for driving motor vehicles.

One object of our invention is to provide an improved mechanism for obtaining an overdrive of the vehicle, or a drive between driving and driven shafts at a ratio greater than a direct or 1 to 1 drive.

A further object of our invention is to provide an efficient, quiet, and simply constructed transmission and overdrive capable of manufacture at relatively low cost and adapted to operate over a long period of use such as is desirable over the life of motor vehicle usage.

A further object of our invention resides in the provision of an improved driving or speed ratio changing mechanism adapted to automatically respond in its actuation to predetermined desired conditions of operation of the vehicle. Thus, by way of example, we have provided a novel overdrive and selective gear transmission which are automatically alternately effective when the vehicle attains a certain speed.

More particularly, and with respect to more limited objects and advantages of our invention, we have provided a novel combination overdrive and selective gear transmission wherein our improved speed ratio changing mechanism automatically makes them alternately effective when a certain vehicle speed is attained. In order to effect the aforesaid automatic engagement and disengagement of the drive through the overdrive and the selective gear transmission alternately, we have provided a clutching means which will automatically connect and release the clutch control parts of the drive under predetermined desired conditions of relative speeds of the engine and the vehicle, or driving and driven shafts. We have preferred to show the automatic clutch for controlling the drive through the selective gear transmission and the overdrive as consisting primarily of two centrifugally operated clutching elements. Each of said elements is adapted for positive clutching engagement with a slot provided in a common shell member. In its broader aspects, however, our improved automatic speed ratio changing mechanism is not limited to any particular type of overdrive, transmission, or combination of overdrive and transmission in the vehicle drive.

We preferably arrange our combination overdrive and transmission in the line of transmission of power from the usual engine to the vehicle driving wheels so that the overdrive is ahead of the transmission instead of rearwardly thereof. This has the advantage that, among other things, the overdrive mechanism is not required to transmit torque in excess of that developed by the engine and consequently the overdrive parts may be made relatively lighter and less rugged than would be the case where the overdrive is subjected to torque in excess of that developed by the engine.

A still further object of our invention is to provide an overdrive and transmission combination of the type mentioned wherein the overdrive and the selective gear transmission are both manually controlled. With our combination it is possible to secure six forward speeds from the combination of our overdrive and our three-speed transmission.

Additional objects are to provide a novel drive between driving and driven shafts wherein an automatically operating direct drive is provided, releasable for accommodating an automatic coupling of the shafts for a speed ratio drive around the releasable direct drive means. We have further provided a novel releasable direct drive means between these shafts which affords a two-way drive connection of a positive synchronizing type automatically responsive to speed for engaging and disengaging the direct drive; also, a speed ratio drive, preferably greater than a direct drive ratio, of the same general character in that a positive speed responsive synchronous clutch control is arranged to function in correlated sequence with the clutching means of the direct drive.

Another object of our invention is to provide an improved automatic clutching means for a plurality of selective drives so arranged that such clutching means act alternately in providing positive drives without shock or jar to the transmission parts during changes in speed ratio drives. Such clutching means has a wide range of application to various driving mechanisms and is particularly advantageous in that a two-way drive is obtained in direct drive as well as in a further speed ratio drive.

Further objects and advantages of our invention will be more apparent from the following detailed description of several embodiments which our invention may assume, reference being had to the accompanying drawings, in which:

Fig. 1 is a sectional elevational view longitudinally through our power driving mechanism.

Fig. 1A is a side elevational view of Fig. 1 and somewhat diagrammatically illustrates one of its controls.

Figs. 2, 3 and 4 are transverse sectional views taken as indicated by the lines 2—2, 3—3 and 4—4, respectively, of Fig. 1.

Fig. 5 is a detail sectional elevational view taken as indicated by the line 5—5 of Fig. 1.

Fig. 6 is a sectional plan view as indicated by the line 6—6 of Fig. 1A.

Fig. 7 is a side elevational view of Fig. 6 showing a portion of the casing broken away.

Fig. 8 is a transverse sectional view taken as indicated by the line 8—8 of Fig. 6.

Fig. 9 is a fragmentary view corresponding to Fig. 1 but illustrating a modified form of our mechanism.

Fig. 9A is an elevational view of Fig. 9 and somewhat diagrammatically illustrates two of its controls.

Fig. 10 is a transverse sectional view taken as indicated by the line 10—10 of Fig. 9.

Referring to the drawings, we have illustrated our driving mechanism operating between a power driving shaft 15 and a driven tail shaft 16. These two shafts may be arranged anywhere along the line of power transmission between the usual engine and driving ground wheels of the motor vehicle and inasmuch as such parts are well known, we have not illustrated them in our drawings.

The driving shaft 15 is suitably journalled in a bearing 17, which is carried by the front wall of a casing 18, the rearward end of the driving shaft extending substantially through a forward overdrive compartment A formed as a portion of the casing structure 18 which is adapted to receive the main part of the speed ratio changing mechanism B.

A primary portion 20 of the driven shaft is rotatably journalled in a bearing 19 carried by a wall 19a, this primary portion 20 of the driven shaft being coaxial with the driving shaft 15 and receiving the drive therefrom by means of a centrifugal clutch—as will later be apparent—for driving the speed ratio transmission within the casing 18. The drive for this transmission is taken from a secondary portion 21 of the driven shaft journalled in a bearing 22 for rotation coaxially with the primary portion 20 of the driven shaft, the driven shaft secondary portion 21 being adapted to drive, through a free wheeling unit C and the tail shaft 16, the rear wheels (not shown) of the motor vehicle in the usual well known manner.

The rearwardly extending end of the driving shaft 15 is hollow for rotatably receiving therewithin a forwardly extending end 23 of the driven shaft secondary portion 21, a bearing 24 providing a journal for these shaft portions.

The driven shaft primary portion 20 has a forwardly extending cylindrical portion, or shell, 25 of enlarged diameter telescopically arranged with the rear portion of the driving shaft 15 and concentric therewith, the cylindrical portion 25 being provided with a plurality of circumferentially spaced slots 26 for receiving the drive from the driving shaft 15 through clutching engagement of centrifugal force-operated clutch elements of the aforementioned centrifugal clutch.

With reference to the centrifugal clutch previously referred to, a pawl carrying cage 27 includes a flange 28 extending around the driving shaft 15 and axially thereof, the cage carrying clutching pawls 29 and 30. The flange 28 is drivingly connected to the driving shaft 15 by splines 31a.

The pawl cage 27 is adapted to carry the pairs of clutching elements or pawls 29 and 30, whereby these pawls are rotated with the cage and capable of radial movement relative thereto.

Referring now, in Fig. 2, to the details of the centrifugal clutch whose pawls 29 are adapted for engagement with the slots 26 of the cylindrical portion 25, the cage 27 is provided with diametrically arranged pairs of lateral abutment extensions or pawl guides 31 and 32, these extensions having arcuate faces 33 fitting within the shell 25. Extensions 31 have pawl engaging faces 34 and extensions 32 have similar bearing faces 35. Fitting within shell 25 are a pair of the said pawls 29, each having a face in sliding engagement with a face 34 of the extension 31 and each extending generally inwardly of the pawl carrying cage 27. Thus, each pawl is formed with a yoke portion 36 seated on an abutment 31 when the pawls are in the Fig. 2 position, each yoke portion having a weighted guide end 38 slidable intermediate a face 34 and the side of the other pawl opposite the side thereof in engagement with the face 35. Abutments 32 limit outward movement of the pawls.

In order to normally urge the pawls outwardly of the pawl cage 27 to the position of the parts as shown in Fig. 2, springs 39 are provided, each spring acting on a head 40 of a screw bolt 41 threadedly engaging openings 42 in the extension 32 and yoke portions 36 are respectively provided with an opening 43 aligned with opening 42, each spring 39 acting on a seat 44 of the associated yoke portion 36.

The shell 25 has the aforesaid plurality of circumferentially spaced pawl receiving slots or openings 26 suitably spaced so that diametrically arranged pairs of slots will simultaneously register with the pawls 29 to receive said pawls under conditions hereinafter more apparent.

It will be apparent that the pawl springs 39 may be readily reached and adjusted from the outside of shell 25 by aligning each of the bolt heads 40 with one of the slots 26. The screw bolts 41 may thus be rotated to further compress or relieve the springs 39 to effect the desired setting governing the action of the pawls 29.

The other ends of the pawls 29 are preferably provided with cam faces 45 acting on the inner edges of slots 26 to cause the pawls to jump the slots prior to their engagement in the slots which takes place when the clutch shell 25 and cage 27 are rotating substantially uniformly at a predetermined speed. When pawls 29 move inwardly from slots 26, the yoke portions 36 slide on bolts 41.

Referring again to the overdrive compartment A in Fig. 1, a gear 47, having external teeth 48, is mounted on the driving shaft 15 and is freely rotatable thereon by a bearing 49. Gear 47 has a rearwardly extending cylindrical portion 50 of enlarged diameter telescopically arranged with the mid-section of the driving shaft 15 and concentric therewith. The cylindrical portion 50 is provided with a plurality of circumferentially spaced slots 51 for receiving the drive from the driving shaft 15 through clutching engagement of centrifugal force-operated clutch elements of a centrifugal clutch which, in the present embodiment, are separate from those previously described.

The pawl cage 27, as mentioned, is adapted to carry the pair of clutching elements or pawls 30, preferably forwardly of the pair of pawls 29, whereby these pawls 30 are rotated with the cage and capable of radial movement relatively thereto, Referring now to the details in Fig. 3 of the centrifugal clutch whose pawls 30 are adapted for engagement with the slots 51 of the cylindrical portion or shell 50, the cage 27 is provided also with diametrically arranged pairs of lateral abutment extensions or pawl guides 52 and 53, these extensions having arcuate faces 54 fitting within the shell 50. Extensions 52 have pawl engaging faces 55 and extensions 53 have similar bearing faces 56. These abutments 52 and 53 provide stops for the inner and outer movements of pawls 30.

Fitting within the shell 50 are a pair of the side pawls 30, each having a face in sliding engagement with a face 55 of the extension 52 and each extending generally inwardly of the pawl carrying cage 27. Thus, each pawl is formed with a yoke portion 57 having a guide end 59 slidable intermediate a face 55 and the side of the other pawl opposite the side thereof in engagement with the face 56.

To normally urge the pawls 30 inwardly of the pawl cage 27 to the position of the parts as shown in Fig. 3, springs 60 are provided, each spring acting on a head 61 of a screw bolt 62 threadedly engaging openings 63 in the extension 53 and yoke portions 57 are respectively provided with an opening 64 aligned with opening 63, each spring 60 acting on a seat 64 of the associated yoke portion 57.

The shell 50, as also the aforedescribed shell 25, has the plurality of circumferentially spaced pawl receiving slots or openings 51 suitably spaced so that diametrically arranged pairs of slots will simultaneously register with the pawls 30 so as to receive said pawls under conditions hereinafter more apparent.

It will be apparent that the pawl springs 60 may be readily reached and adjusted from the outside of shell 50 by aligning each of the bolt heads 61 with one of the slots 51. The screw bolts 62 may thus be rotated to further compress or relieve the springs 60 to effect the desired setting governing the action of the pawls 30.

The other ends of the pawls 30 are preferably provided with cam faces 65 acting on the inner edges of slots 51 to cause the pawls to jump the slots prior to their engagement in the slots which takes place when the clutch shell 50 and the cage 27 are rotating substantially uniformly at a predetermined speed. When pawls 30 move outwardly toward slots 51, the yoke portions 57 slide on bolts 62.

If desired, each pawl 30 may be interconnected by an equalizer ring 67, best shown in Fig. 4, surrounding driving shaft 15 and having diametrically arranged outwardly opening slots 68 for respectively receiving pins 69. One of the pins is carried by each pawl yoke portion 57 and the ring is rotatably guided by a groove 70 in the rearward face of gear 47. The pawls 30 are thus tied together and means provided for equalizing or synchronizing the action of the pawls so that they will move outwardly and inwardly in unison.

This type of equalizer ring may also, if desired, be used to control the pawls 29, best shown in Fig. 1. The forward face of the driving shaft primary portion 20 is provided with a groove 71 for accommodating an equalizer ring 72. The pawls 29 are thereby also tied together and means provided for equalizing or synchronizing the action of the pawls.

Referring now to speed ratio transmission B in Fig. 1, a shiftable clutch mechanism 73 is shown as drivingly connecting either the driven shaft primary and secondary portions 20 and 21, respectively, or the driven shaft primary portion 20 and a second speed gear 74. The rearwardly end of the primary portion is provided with a toothed clutch member 75 and rotatably mounted on the secondary portion 21 is the second speed gear 74 having a toothed clutch member 76. Splined on the secondary portion 21 is a hub 77 upon which is splined an axially shiftable ring or connector clutch member 78. The splined teeth 79 of the ring 78 are adapted to respectively engage the teeth of clutch member 75 or 76.

The secondary portion 21 is suitably splined at 80 to slidably receive a low speed and reverse driven gear 81 adapted for sliding movement along the splines 80 by reason of a shifting clutch collar 82. It will be apparent that when the gear 81 is moved forwardly into mesh with a countershaft gear 83 the secondary portion 21 will receive a low gear ratio drive from the primary portion 20 through a gear 84 and driving countershaft 85. When the gear 81 is moved rearwardly into mesh with the usual reverse idler gear 86 (which is in constant mesh with a countershaft gear 87), then the primary portion 20 will transmit a reverse drive to the secondary portion 21 through gear 84 and countershaft 85.

A fixed countershaft spindle 88 extends parallel to and offset from the driving shaft 15 and the primary and secondary portions 20 and 21 respectively. Support for countershaft spindle 88 is provided forwardly at 89 and rearwardly at 90 in casing 18. Driving countershaft 85 is journalled on the countershaft spindle 88 and suitably supported internally at 91, 92, and 93; and externally by a bearing 94 secured to casing 18.

The forward end of the countershaft 85 is provided with a driving gear 95 which is in continuous mesh with the external teeth of gear 47. Rearwardly of the countershaft driving gear 95 is the aforementioned driving gear 84 which continuously meshes with gear teeth 96 formed on the driving shaft primary portion 20. Another countershaft driving gear 97 continuously meshes with the second speed gear 74. Rearwardly of the second speed countershaft gear 97 are the aforementioned low speed countershaft gear 83 and the reverse speed countershaft gear 87, the latter being in constant mesh with the reverse idler gear 86. Gears 83 and 86 are adapted to be engaged, as earlier explained, by shifting the gear 81 forwardly or rearwardly, respectively.

To operate the speed ratio changing mechanism B, the low speed and reverse gear 81 is connected to a shifter rail 100 by a fork 98 engaging a collar 99. A second similar rail which is slidably mounted beside rail 100 and therefore not shown in Fig. 1, is adapted to control the intermediate and direct drive positions of the shiftable clutch 73 through a lever 101 interconnecting this rail with clutch 73. This gear shift lever 101 actuates the shifter forks 98 and 101 through their respective rails, preferably by the well known H-gate method.

We preferably incorporate in our driving mechanism as a part of the driving means between the driven shaft secondary portion 21 and the aforementioned driven tail shaft 16, an overrunning or free wheeling clutch C, best shown in Figs. 1 and 5, although it should be noted that such overrunning clutch may be omitted as desired. The secondary portion 21 extends rearwardly beyond the bearing 22 and is hollow for rotatably receiving therewith a forwardly extending end 102 of the tail shaft 16, a bearing 103 providing a journal for these shaft portions. This clutch may in itself be of any suitable form, the illustration showing a conventional device, in which an inner cam member 104 is driven by splines 105 of the driven shaft secondary portion 21, the cam faces 106 being engaged by cylinders 107 so that by the driving rotation of the secondary portion 21 the high sides of the cam faces 106 will wedge the cylinders 107 between cam member 104 and an outer cylindrical driven member 108 of the overrunning clutch to establish a direct drive thereto. The cylindrical portion of the overrunning clutch C is formed with a rearward extension 109 which is drivingly connected to splines 110 of the tail shaft 16. Thus, it is evident that whenever the engine or driving shaft 15 slows down, the vehicle and the tail shaft 16 may, by reason of the clutch C overrun the driving shaft 15, other conditions permitting such action as will be presently apparent.

A means for rendering the overrunning clutch C inoperative has been provided. Teeth 111 are carried by a shiftable clutch controlling device 112 driven by the splines 105 of the driven shaft secondary portion 21, and when shifted rearwardly engage internal clutch teeth 113 formed on a forward extension 114 of cylindrical member 108. When clutch 112 is shifted rearwardly as aforesaid, driven shaft secondary portion 21 and tail shaft 16 will be connected through clutch 112 and cylindrical member 108 to lock out or render the overrunning clutch inoperative. With clutch 112 in the position shown in Fig. 1, the secondary portion 21 drives the tail shaft 16 through the members 104 and 108 of the overrunning clutch C, the drive passing from cylindrical member 108 and extension 109 thereof to the tail shaft 16.

With more particular reference to the means for controlling the shifting movement of clutch 112 to render the overrunning clutch C operative or inoperative, a dash control has been provided which is best shown in Fig. 1A. A lever 115 is mounted and pivoted on case 18, its lower face engaging a suitable remote control—in our drawings a Bowden wire dash control—extending to the illustrated dash control. Thus a Bowden wire 116, as diagrammatically illustrated, extends for convenient manipulation by the driver, such position being indicated by the usual dash 117 which mounts a handle or knob 118 connected to the other end of the Bowden wire 116. When the knob 118 is in the position shown in Fig. 1A, and providing the low speed and reverse gear 81 is not engaged with the reverse idler gear 86, the shiftable clutch 112 will not be in mesh with the internal clutch teeth 113 of the cylindrical portion 114, as illustrated in Fig. 1, but when the knob 118 is pulled outwardly from the dash, the shiftable clutch 112 will be engaged with the internal clutch teeth 113 of the cylindrical portion 114 so as to render the overrunning clutch C inoperative.

A further means for shifting the clutch 112 has been provided which is independent of the aforementioned dash control. A shifter arm 119, best shown in Figs. 6, 7 and 8, is mounted at a right angle on a horizontal rod 120 and thusly positioned rearwardly of the low speed and reverse gear 81. The rod 120 is parallel to the longitudinal axis of the driving mechanism and is slidably supported by the case 18 at 121 and 122. Secured to the rearward portion of rod 120 at a right angle is a shifter fork 123 adapted to actuate a shift collar 124 formed on the shiftable clutch 112. The rearwardly extending portion of the rod 120 is hollow to receive therein a spring 125, the other end of the spring 125 being housed in a recess 126 formed in the case 18. Thus it is evident that when the gear 81 is shifted rearwardly to engage the reverse idler gear 86, gear 81 will move the face of the shifter arm 119 with it, thereby forcing the shiftable clutch 112 into its rearward position (not shown), independently of the aforementioned dash control.

Again referring to the dash control earlier mentioned for the independent control of the shiftable free wheeling clutch 112, forwardly of the horizontal rod 120 and at right angles thereto, a shaft 127 is journalled in the case 18. On the portion of the shaft 127 inside the case 18 is an actuating member 128 which is adapted to bear against the forward end of the rod 120. At the outer end of the shaft 127 the aforementioned lever 115 is secured thereon to be actuated by the dash control earlier described. This is a means for shifting the position of clutch 112 independently of that effected by a setting of the reverse gearing of the speed ratio changing mechanism B.

In the operation of our driving mechanism, and with the parts positioned as illustrated, it will be apparent that the drive passes from the driving shaft 15 to the driven shaft primary portion 20 as a direct two-way drive through the intermediary of pawl cage 27 and pawl 29.

When the pawl 29 is in engagement with slots 26 as shown, direct drive may be effected by forwardly shifting of the clutch 73, by conventional actuation of the shift lever 101 in the usual manner for direct drive, to cause the internal teeth of the shiftable ring 78 to engage the gear type clutch member 75. The drive then passes from the driven shaft primary portion 20 to the driven shaft secondary portion 21 through the intermediary of the ring 78. From the secondary portion 21 the drive passes through the overrunning clutch C in the usual manner to the tail shaft 16, if the dash control is as positioned in Fig. 1A.

For intermediate speed under like conditions of pawl 29 and overrunning clutch C described for direct drive, the clutch 73 is shifted rearwardly to cause the internal teeth of the shiftable ring 78 to engage the gear type clutch member 76. The drive then passes from the driven shaft primary portion 20 to the driven shaft secondary portion 21 through the intermediary of gear 84, countershaft 85, gear 97, and second speed gear 74.

Low speed, under like conditions for pawl 29 and overrunning clutch C described for direct drive, and with clutch 73 in the position shown, is effected by shifting low speed and reverse gear 81 forwardly to cause it to mesh with countershaft gear 83. The drive then passes from the driven shaft primary portion 20 to the driven shaft secondary portion 21 through the intermediary of gear 84, countershaft 85, gear 83, and low speed and reverse gear 81.

Neutral, of course, is effected by the positioning of the parts as shown in Fig. 1, regardless of the position of the overrunning clutch dash control knob 118 in Fig. 1A.

For reverse speed under like conditions of pawl 29 described for direct drive, and with clutch 73 in the position shown, the low speed and reverse gear 81 is shifted rearwardly to cause it to mesh with the reverse idler gear 86 in the usual manner, the idler gear 86 being in continuous mesh with the countershaft gear 87 to reverse the drive therethrough. The overrunning clutch C must be rendered inoperative when reverse drive is desired. To this end it is evident that when the low speed and reverse gear 81 is shifted rearwardly it engages the face of the shifter arm 119, it moves the arm rearwardly with it and thereby, through the intermediary of horizontal rod 120 and shifter fork 123, carries the shiftable clutch 112 into engagement with the internal teeth of the forward extension 114 to render the overrunning clutch C inoperative; if desired, the overrunning clutch dash control knob 118 may be pulled outwardly from the dash 117 by the driver, the horizontal rod 120 thereupon being urged to its rearward position directly by the movement of the actuating member 128 to cause the overrunning clutch C to be rendered inoperative in the same manner from that point as with the reverse gear actuated overrunning clutch control, at which time the shifter arm 119 will thereby be moved out of the range of the rearward movement of the reverse gear 81 to render it ineffective. The drive then passes from the driven shaft primary portion 20 to the driven shaft secondary portion 21 through the intermediary of gear 84, countershaft 85, gear 87, reverse idler gear 86, and low speed and reverse gear 81. It is thus apparent that the reversed drive will pass from the secondary portion 21 through the shifted clutch 112, the forward extension 114 and the rearward extension 109 thereof, to the tail shaft 16.

When the shiftable clutch 112 is in its forward position, as shown in Fig. 1, and the overrunning clutch dash control knob 118 in its "in" position as shown in Fig. 1A, the drive from the driven shaft secondary portion 21 passes to the tail shaft 16 through the intermediary of inner cam member 104, rollers 107, and the cylindrical member 108 and rearward extension 109 thereof. When the shiftable clutch 112 is shifted to its rearward position either by the actuation of the reverse gear overrunning clutch control mechanism or by pulling the overrunning clutch dash control knob 118 away from the dash 117 to the "out" position, its external teeth 111 mesh with the internal teeth 113 of the forward portion 114. The drive then passes from the driven shaft secondary portion 21 to the tail shaft 16 through the intermediary of the shiftable clutch 112, and the forward portion 114 and rearward extension 109 thereof. Whenever clutch 112 is in its rearward position, the spring 125 is compressed against recess 126 in the case 18 by the rearwardly movement of rod 120, and upon the reverse gear 81 being moved toward its neutral position on driven shaft secondary portion 21, as shown in Fig. 1; or if the reverse gear is already in its neutral position, upon pushing the overrunning clutch dash control knob 118 inwardly toward the dash to its "in" position,— the spring 125 will force the rod 120 to its forward position as shown in Figs. 6 and 7.

The reverse neutral, low, intermediate, and direct drive speeds, as explained, are all normally effected under conditions wherein the pawls 29 are in engagement with slots 26. With reference to the operation and necessary conditions for the engagement of pawls 29 with slots 26 as shown in Fig. 1, pawls 29 will be in this position normally at all speeds up to a predetermined critical speed of rotation of driving shaft 15 and pawl cage 27. Under this critical speed, the pawl springs 39 urge pawls 29 outwardly to maintain the pawls 29 in engagement with slots 26. Above said critical speed the weighted guide ends 38 of pawls 29 build up a centrifugal force sufficient to cause said pawls to move inwardly to their retracted position out of engagement with slots 26 by overcoming the resistance of pawl springs 39, such retraction taking place just as soon as the friction of the drive is relieved or reversed between the sides of the slots and pawls. Thus when the vehicle driver momentarily releases the usual accelerator pedal to cause the vehicle to drive the engine, this reversal of drive permits retraction of the pawls.

When pawls 29 move to their retracted position, the clutch 73 preferably being in its direct drive position, the condition of the moving parts of the mechanism is such that the pawls 30 will fly outwardly, such action being determined by the resistance of pawl springs 60 and the adjustment by the head 61, to engage slots 51. During the direct drive through pawls 29, slots 51 are driven slower than pawls 30 by reason of gear train 96, 84, 95 and 48. During the transition from direct to overdrive, pawls 29 move inwardly and pawls 30 move outwardly, but pawls 30 cam over slots 51 until the drive shaft 15 falls in speed to approximately that of slots 51 at which time pawls 30 engage for overdrive.

When the overdrive pawls 30 are engaged with slots 51, the clutch 73 being in its direct drive position, the drive will pass from the driving shaft 15 to the driven shaft secondary portion 21 through the intermediary of pawl cage 27, pawls 30, cylindrical portion 50, gear 47, gear 95, countershaft cluster gear 85, gear 84, driven shaft primary portion 20, and clutch 73. Whenever overdrive speed is desired, it is desirable to render the overrunning clutch C inoperative by pulling its dash control knob 118 to its position away from dash 117. When the overrunning clutch C is thusly rendered inoperative, the overdrive continues from the driven shaft secondary portion 21 to the tail shaft 16 through the intermediary of the clutch 112, and forward portion 114 and rearward extension 109 thereof.

It is possible, when the overdrive pawls 30 are in engagement with slots 51, to select with the shift lever 101 the various forward speeds provided in the speed ratio changing mechanism, such as low and intermediate speeds, by shifting the clutch 73 to its rearward position for second, and by shifting the low speed and reverse gear 81 to its forward position for first. Thus it is possible to obtain variances in the original gear ratios by a compounding of the overdrive gear train and one of the selective gear trains for each variance.

Whenever the motor vehicle is normally driven in overdrive at a speed under the critical speed necessary for engagement of the overdrive pawls 30 with slots 51, these pawls will be urged inwardly by springs 60 to release said pawls from engagement with slots 51, such retraction occurring just as soon as the friction of the drive is relieved or reversed between the slots and the pawls. Thus, when the vehicle driver momentarily releases the usual accelerator pedal to cause the vehicle to drive the engine, this reversal of drive permits retraction of pawls 30. Thereupon pawls 29, which by this time have moved outwardly by action of pawl springs 39 overcoming the centrifugal force thereon, will engage slots 26 as the drive shaft in speeding up reaches the speed of the driven shaft slots 26 for again automatically establishing the direct two-way positive drive.

The direct and overdrive centrifugal clutching means are thus arranged so that one clutch or the other is always engaged or trying to engage for a drive. With the vehicle standing still and up to the overdrive speed of say 45 miles per hour, by way of example, the direct drive pawls 29 maintain their clutching engagement with slots 26. Furthermore, the arrangement of the automatic clutches is preferably such that the overdrive pawls 30 are released for movement toward their slots 51 sufficiently below the minimum speed at which pawls 29 will move inwardly so that when the driving shaft speed reduces (for the transition from direct drive to overdrive) the overdrive pawls 30 will still be projected outwardly when the speed of the pawls 30 is substantially synchronized with the speed of the slots 51.

The direct drive, on acceleration, will be maintained above the critical speed of pawls 29 because of the driving friction of pawls 29 and slots 26, the overdrive pawls 30 being projected outwardly but merely "jumping" the slots 51 until the accelerator pedal is momentarily released to disengage the direct drive clutch and engage the overdrive clutch by synchronizing the clutching structures 30 and 51.

On decelerating, in overdrive, with the car driving the engine, the friction of pawls 30 at slots 51 will likewise hold the pawls 30 from disengaging the slots until well below the critical speed of the overdrive clutch so that on acceleration, the pawls 30 move inwardly and pawls 29 move outwardly to establish direct drive as soon as the speed of the drive shaft comes up to the speed of the driven shaft.

Inasmuch as overdrive is generally desirable only at relatively high car speeds, the clutch 73 will ordinarily be engaged with teeth 75 for a direct drive during automatic functioning of the overdrive.

In Figs. 9, 9A and 10 we have illustrated a somewhat modified arrangement of parts primarily substituting a manual control for the centrifugally actuated speed responsive clutches, and have used similar reference numerals to indicate parts of similar construction and operation. It should be understood that, except for the manually controlled overdrive, the transmission in general is as shown in Fig. 1.

In this modified arrangement a shiftable clutch mechanism 129 is shown drivingly connecting either overdrive gear train 130 or the driven shaft primary portion 131 (similar to member 20 in the Fig. 1 embodiment). The rear end of gear 48a is provided with a toothed clutch member 132 and rotatably mounted rearwardly thereof on driving shaft 15 is the driven shaft primary portion 131 having gear 98a and a toothed clutch member 133. Splined on the driving shaft between the clutch members 132 and 133 is a driving hub 134 upon which is splined an axially shiftable ring or connector member 135. The splined teeth 136 of the ring 135 are adapted to respectively engage the teeth of clutch member 132 or 133.

Means has been provided for controlling the shifting movement of clutch 129 to connect the driving shaft either with the overdrive gear train 130 or the driven shaft primary portion 131, although it is understood that other means for shifting clutch 129 may be employed if desired, such as power mechanism employing a fluid pressure application (air, oil, vacuum and the like), electrically actuated mechanisms, etc. A lever 137 is mounted and pivoted on case 18, its lower face engaging a suitable remote control—in our drawing a Bowden wire dash control—extending to the illustrated dash control. Thus a Bowden wire 116a, as diagrammatically illustrated, extends for convenient manipulation by the driver, such position being indicated by the usual dash 117 which mounts a handle or knob 138 connected to the other end of the Bowden wire 138. When the knob 138 is in the position shown in Fig. 9A, and providing the low speed and reverse gear 81 is not engaged with the reverse idler gear 86, the shiftable clutch 129 will be in its rearward position in engagement with clutch member 133 to provide a direct two-way drive through the speed ratio changing mechanism B as in Fig. 1; but when the knob 138 is pulled away from the dash, the shiftable clutch 129 will be in its forward position in engagement with clutch member 132 to provide an overdrive through gearing as in Fig. 1.

Again referring to the dash control for the shifting of clutch 129, a shaft 139 is journalled in the case 18, as shown in Fig. 10. The portion of the shaft 139 outside the case 18 has secured thereon the aforementioned lever 137; the portion of the shaft inside the case has extension 140, upon the other end of which is fixed a shifter fork 141. The fork 141 engages a groove 142 provided on the shiftable ring 135, the ring 135 thus being adapted to be shifted by proper positioning of the dash control knob 138.

The operation of the mechanism illustrated in Figs. 9, 9A and 10 is substantially the same as in the foregoing embodiment of our invention, it being apparent that with the parts positioned as illustrated in Fig. 9 the driving mechanism is in neutral, the shiftable clutch rotating freely with the driving shaft 15.

When the shiftable clutch 129 is shifted rearwardly to engage the clutch member 133, the shiftable clutch 73 being in its forward position, a direct drive is effected from the driving shaft through clutch 129 to the driven shift primary portion 131, from which point the direct drive may be continued through the speed ratio changing mechanism B and the overrunning clutch C, or may be geared down to second, first, or reverse speeds by manipulating the shift lever 101 in the usual manner as explained in connection with Fig. 1. At the time the shiftable clutch 129 is in this rearward position, its dash control knob 138 is in its inward position of Fig. 9A, and its actuating mechanism is positioned as shown.

If the dash control knob 138 is pulled away from dash 117, the Bowden wire 116a will move to actuate the lever 137 forwardly which in turn acts on the shaft 139 and its extension 140 to move the shifter fork 141 forwardly to cause the shiftable clutch 141 to engage the forward clutching member 132. Overdrive speed is thereby effected, the shiftable clutch 73 being in its forward position. The drive passes from the driving shaft 15 to the driven shaft primary portion 131 through the intermediary of shiftable clutch 141, gear 48a, countershaft gear 95, cluster gear 85, and countershaft gear 84. From that point the overdrive passes on as explained in our Fig. 1 embodiment.

It is possible to provide additional speed ratios by compounding of gear trains of the overdrive and any one of the selective trains while the shiftable clutch 129 is in its forwardly position to effect overdrive. Thus the gear shift lever 101 may be moved in the usual manner as to selectively obtain second, first and reverse speeds. When this is done the operation of the speed ratio changing mechanism, which was previously explained for our embodiment in Fig. 1, provides two additional forward speeds and one additional reverse speed by selective manipulation of the gear shift lever 101.

The overrunning clutch C may be rendered inoperative by pulling its dash control knob 118 away from dash 117, as earlier explained. Although it is usually advisable to render the overrunning clutch inoperative while the shiftable clutch 129 is in its forwardly position, this is not necessary and free wheeling may always be used except for reverse when the reverse gear automatically locks out the overrunning clutch just as in Fig. 1.

For convenience of reference, driving shaft 15 may be said to have forward rotation as it rotates always in one direction from the engine. Likewise driven shaft portion 20, which is intermediate shafts 15 and 21, has forward rotation. Shaft portion 21, on the other hand, has either forward rotation or else reverse rotation as when gear 81 is meshed with reverse idler gear 86.

We do not limit our invention, in its broader aspects thereof, to the particular combination and arrangement of parts shown and described for illustrative purposes since various modifications will be apparent within the teachings of our invention as defined in the appended claims.

What we claim is:

1. In a motor vehicle drive, a driving shaft, a driven shaft aligned therewith, means including a gear train intermediate said shafts for driving said driven shaft at a speed faster than that of said driving shaft, said intermediate driving means including speed responsive clutch means so constructed and arranged in association with said shafts and gear train as to provide a direct two-way drive between said shafts releasable to provide said faster drive between said shafts through said gear train, said speed responsive clutch means comprising a plurality of centrifugally movable clutching members drivingly connected to one of said shafts and a plurality of clutching means adapted for alternative positive clutching engagement and disengagement by said clutching members respectively, said plurality of clutching means being respectively drivingly connected to the other of said shafts and to an element of said gear train.

2. In a motor vehicle drive, a driving shaft, a driven shaft aligned therewith, means including a gear train intermediate said shafts for driving said driven shaft at a speed faster than that of said driving shaft, said intermediate driving means including speed responsive clutch means so constructed and arranged in association with said shafts and gear train as to provide a direct drive between said shafts releasable to provide said faster drive between said shafts through said gear train, said speed responsive clutch means comprising a plurality of centrifugally movable clutching members drivingly connected to one of said shafts and a plurality of clutching means respectively drivingly connected to the other of said shafts and to an element of said gear train, said plurality of clutching means being respectively adapted for alternative positive clutching engagement and disengagement by said centrifugally movable clutching members, and means for preventing engagement of each of said clutching members until rotatively synchronized with its associated clutching means.

3. In a motor vehicle drive, a driving shaft, a driven shaft aligned therewith, speed responsive clutching means including positively engageable clutching elements drivingly connecting said shafts when rotatably synchronized for a direct drive therebetween and so constructed and arranged as to directly couple said shafts when the latter are not rotating and to release said direct drive in response to a predetermined speed of said shafts, means including a gear train intermediate said shafts for driving said driven shaft from said driving shaft at a speed ratio different from said direct drive, said intermediate driving means further including additional speed responsive clutching means including positively engageable clutching members so constructed and arranged in association with said gear train and one of said shafts as to automatically establish said speed ratio drive subsequently to operation of the first said clutching means in releasing said direct drive and in response to synchronization of the speeds of rotation of said clutching members, one of said clutching members being adapted for movement by centrifugal force relative to said clutching elements.

4. In a motor vehicle drive, a driving shaft, a driven shaft aligned therewith, speed responsive clutching means drivingly connecting said shafts when rotatably synchronized for a direct drive therebetween and so constructed and arranged as to directly couple said shafts when the latter are not rotating and to release said direct drive in response to a predetermined speed of said shafts, means including a gear train intermediate said shafts for driving said driven shaft from said driving shaft at a speed ratio different from said direct drive, said intermediate driving means further including additional speed responsive clutching means including positively engageable clutching members so constructed and arranged in association with said gear train and one of said shafts as to automatically establish said speed ratio drive subsequently to operation of the first said clutching means in releasing said direct drive and in response to synchronization of the speeds of rotation of said clutching members, the first said clutching means comprising a radially movable centrifugal force operated clutching element driven with one of said shafts and a companion clutching structure driven with the other of said shafts and adapted for positive clutching engagement with said clutching element, said clutching element being adapted for centrifugal force movement relative to movement of said clutching members.

5. In a motor vehicle drive, a driving shaft, a driven shaft aligned therewith, speed responsive clutching means drivingly connecting said shafts for a direct drive therebetween and so constructed and arranged as to release said direct drive in response to a predetermined speed of said shafts, means including a gear train intermediate said shafts for driving said driven shaft from said driving shaft at a speed ratio different from said direct drive, said intermediate driving means further including additional speed responsive clutching means so constructed and arranged in association with said gear train and one of said shafts as to engage and thereby automatically establish said speed ratio drive subsequently to operation of the first said clutching means in releasing said direct drive, the second said clutching means comprising a centrifugal force operated clutching element driven with one of said shafts and a companion clutching structure driven with an element of said gear train and adapted for positive clutching engagement with said clutching element.

6. In a motor vehicle drive, a driving shaft, a driven shaft aligned therewith, means including a gear train for automatically establishing direct and speed ratio drives between said shafts, said driving means further including a pair of separate clutches respectively operable to establish said direct drive between said shafts and said speed ratio drive between said shafts through said gear train, each of said clutches being disengaged and inactive as a driving intermediary when the other of said clutches operates to establish its aforesaid drive, each of said clutches comprising a centrifugal force operated clutching member and a second clutching member engageable therewith in response to approximate synchronization of the speeds of rotation of said members.

7. In a motor vehicle drive, a driving shaft, a driven shaft aligned therewith, means including a gear train for autmoatically establishing a direct drive and an overdrive between said shafts, said driving means further including a pair of clutching means respectively operable to establish said drives, and means preventing operation of each of said clutching means to establish its said drive prior to release of the other of said clutching means said pair of clutching means comprising a pair of relatively movable centrifugal force actuated clutching elements and a pair of slotted clutching members respectively engageable with said clutching elements in response to approximate synchronization therewith.

8. In a power driving mechanism having a driving shaft and a shaft driven therefrom, releasable clutching means intermediate said shafts adapted to transmit a direct two-way drive therebetween, speed responsive clutch means including driving and driven clutching structures adapted for clutching action in response to substantially synchronized rotation thereof at or above a predetermined speed, means for driving one of said structures from said driving shaft, and means for driving the other of said structures from said driven shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and substantially synchronized rotation of said clutching structures, said releasable direct drive clutching means comprising a pair of positively engageable clutching members respectively adapted for driving connection to said driving and driven shafts, one of said clutching members having centrifugal force movement relative to the other, and means preventing engagement of said clutching members until their rotative speeds are substantially synchronized subsequently to release of said clutching structures.

9. In a power driving mechanism having a driving shaft and a shaft driven therefrom, releasable speed responsive clutching means intermediate said shafts adapted to transmit a direct two-way drive therebetween, said speed responsive clutching means being adapted to disengage at or above a predetermined speed of rotation thereof to release said direct two-way drive, additional speed responsive clutch means including driving and driven clutching structures adapted for clutching action in response to substantially synchronized rotation thereof at or above a predetermined speed, means for driving one of said structures from said driving shaft and at the same speed as that of said driving shaft, and means including a countershaft gear train for driving the other of said structures from said driven shaft and at a speed less than that of said driving shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and in response to reducing the rotational speed of the driving shaft to effect approximate synchronized rotation of said clutching structures.

10. In a power driving mechanism having a driving shaft and a shaft driven therefrom, releasable clutching means intermediate said shafts adapted to transmit a direct two-way drive therebetween, speed responsive clutch means including driving and driven clutching structures adapted for clutching action in response to substantially synchronized rotation thereof at or above a predetermined speed, means for driving one of said structures from said driving shaft and at the same speed as that of said driving shaft, and means for driving the other of said structures from said driven shaft and at a speed less than that of said driving shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and in response to reducing the rotational speed of the driving shaft to effect approximate synchronized rotation of said clutching structures, said releasable direct drive clutching means comprising a centrifugal force operated clutching element drivingly connected to said driving shaft and a clutching element drivingly connected to said driven shaft and adapted to clutchingly receive said centrifugal element.

11. In a motor vehicle power transmission, a driving shaft, driven shaft means comprising primary and secondary driven shaft portions aligned with said driving shaft, said primary driven shaft portion being disposed between said driving shaft and said secondary driven shaft portion, a countershaft disposed to one side of said driven shaft portions, a driving pinion rotatably journalled on said driving shaft, a clutch member carried by said driving pinion and adapted to receive a drive from said driving shaft for driving said countershaft, a countershaft gear meshing with said driving pinion, a second gear carried by said countershaft rearwardly of the first said countershaft gear, a gear carried by said primary driven shaft portion and meshing with said second countershaft gear for driving said primary driven shaft portion at a speed greater than that of said driving pinion, a second clutch member carried by said primary driven shaft portion and adapted to receive a drive from said driving shaft, change speed gearing between said countershaft and said secondary driven shaft portion for driving said secondary driven shaft portion at a low forward speed or in reverse, said change speed gearing including a second speed gear rotatably journalled on said secondary driven shaft portion and a countershaft gear meshing therewith, manually controlled means for selectively operating said change speed gearing to provide said low and reverse drives and to selectively clutch said secondary driven shaft portion with said second speed gear or with said primary driven shaft portion, and speed responsive clutching means driven by said driving shaft and adapted to alternatively drivingly connect said clutch members with said driving shaft.

12. In a motor vehicle power transmission, a driving shaft, a driven shaft, a shaft intermediate said driving and driven shafts, speed responsive clutching means directly and positively coupling said driving and intermediate shafts for a releasable two-way drive therebetween, overdrive gear train means between said driving and intermediate shafts around said speed responsive clutching means, said overdrive gear train means including additional speed responsive clutching means adapted to positively drivingly couple said driving and intermediate shafts through the overdrive gear train, and means including the first said speed responsive clutching means for selectively drivingly connecting said driven shaft to said driving shaft for driving the driven shaft in a forward low speed ratio or reverse.

13. In a motor vehicle power transmission, a driving shaft, a driven shaft, a shaft intermediate said driving and driven shafts, speed responsive clutching means directly and positively coupling said driving and intermediate shafts for a releasable two-way drive therebetween, overdrive gear train means between said driving and intermediate shafts around said speed responsive clutching means, said overdrive gear train means including additional speed responsive clutching means adapted to positively drivingly couple said driving and intermediate shafts through the overdrive gear train, and means including the first said speed responsive clutching means for selectively drivingly connecting said driven shaft to said driving shaft for driving the driven shaft in a forward low speed ratio or reverse, each of said speed responsive clutching means comprising a slotted clutching element and a centrifugal force operated pawl adapted to engage the slotted element when the speeds thereof are substantially synchronized.

14. In a motor vehicle, a driving shaft, a driven shaft aligned therewith, speed responsive clutching means including positively engageable clutching members drivingly connecting said shafts when rotatably synchronized for a direct drive therebetween and so constructed and arranged as to release said direct drive in response to a predetermined speed of said shafts, means including a gear train intermediate said shafts for driving said driven shaft from said driving shaft at a speed ratio different from said direct drive, said intermediate driving means further including additional speed responsive clutching means so constructed and arranged in association with said gear train and one of said shafts as to engage and thereby automatically establish said speed ratio drive subsequently to operation of the first said clutching means in releasing said direct drive, the second said clutching means comprising a centrifugal force operated clutching element driven with one of said shafts and a companion clutching structure driven with an element of said gear train and adapted for positive clutching engagement with said clutching element when rotatably synchronized therewith, said clutching element being adapted for centrifugal force movement relative to movement of said clutching members.

15. In a motor vehicle drive, a driving shaft, a driven shaft aligned therewith, means including a gear train for alternatively establishing a direct two-way drive and a two-way overdrive between said shafts, said drive means further including a pair of automatically operating clutches operably associated therewith for alternate positive clutching engagement to selectively establish said drives, each of said clutches comprising a pair of positively engageable clutch elements one of which is movable by centrifugal force acting thereon for clutching engagement with the other when the clutch elements are approximately synchronized.

16. In a motor vehicle drive, a driving shaft, a driven shaft aligned therewith, means for alternatively establishing a direct drive and an overdrive from said driving shaft to said driven shaft, said means for establishing the overdrive including a gear train adapted to connect said shafts, said drive means including a pair of automatically operating clutches operably associated therewith for alternate positive clutching engagement to selectively establish said drives, each of said clutches comprising a pair of positively engageable clutch elements one of which is movable by centrifugal force acting thereon for clutching engagement with the other when the clutch elements are approximately synchronized.

17. In an engine driven motor vehicle power transmission, a power input shaft adapted to receive forward drive from the engine, a power output shaft adapted to drive the vehicle, a shaft aligned with and disposed intermediate said input and output shafts, said intermediate shaft being adapted to receive forward drive from said input shaft, means operating to establish an operable driving connection between said input and intermediate shafts such that when the engine is accelerated from an idling condition to drive the input shaft relatively slowly as in starting the vehicle from rest the intermediate shaft will be driven by said input shaft at a predetermined speed ratio, means operating to establish a second operable driving connection between said input and intermediate shafts such that when the engine has operated as aforesaid to drive the input shaft at or above a predetermined speed appreciably faster than that aforesaid and then momentarily slowed down the intermediate shaft will be driven by said input shaft at a predetermined speed ratio faster than that aforesaid, the first said driving means automatically releasing its drive at or above said faster input shaft speed when the vehicle driver allows the engine to momentarily slow down as aforesaid, the first said driving means operating to automatically establish its drive subsequently to release of the second said driving means and means selectively operable to establish forward or reverse drive of the output shaft from the intermediate shaft, said intermediate shaft being driven forwardly through one of said driving means during said forward and reverse drives of the output shaft from the intermediate shaft.

18. In an engine driven motor vehicle power transmission, a forwardly rotatable power input shaft adapted to receive drive from the engine, a forwardly and reversely rotatable power output shaft adapted to drive the vehicle, a forwardly rotatable shaft aligned with and disposed intermediate said input and output shafts, means providing a relatively slow speed drive connection from the input shaft to the intermediate shaft for accelerating the vehicle from rest, means providing a relatively fast speed drive connection from the input shaft to the intermediate shaft after the vehicle has been accelerated in said relatively slow speed drive connecting means, said relatively slow speed drive connection means releasing its drive to accommodate operation of said relatively fast speed drive connecting means in response to momentary release of the engine drive, the first said driving means operating to automatically establish its drive subsequently to release of the second said driving means, and means operable to selectively establish forward or reverse drive of the output shaft from the intermediate shaft, said intermediate shaft being driven forwardly through one of said driving means during said forward and reverse drives of the output shaft from the intermediate shaft.

19. In an engine driven motor vehicle power transmission, a forwardly rotatable power input shaft adapted to receive drive from the engine, a forwardly and reversely rotatable power output shaft adapted to drive the vehicle, a forwardly rotatable shaft aligned with and disposed intermediate said input and output shafts, means providing a relatively slow drive connection between the input shaft and the intermediate shaft, means providing a relatively fast drive connection between the input shaft and the intermediate shaft, means selectively operable to establish forward or reverse drive of the output shaft from the intermediate shaft, said intermediate shaft being driven forwardly through one of said driving means during said forward and reverse drives of the output shaft from the intermediate shaft, said relatively slow drive means affording automatic connection of the input and intermediate shafts when the driver controls the engine to deliver power therefrom as in accelerating the vehicle from rest with said selectively operable means operated to provide forward drive of the output shaft, said relatively slow drive means releasing its drive connection and said relatively fast drive means establishing its drive connection when the driver controls the engine to momentarily diminish its power output after acceleration of the vehicle through said relatively slow drive means, the first said driving means operating to automatically establish its drive subsequently to release of the second said driving means.

20. In a power driving mechanism having a driving shaft and a shaft driven therefrom, releasable clutching means intermediate said shafts adapted to transmit a direct two-way drive therebetween, speed responsive clutch means including driving and driven clutching structures adapted for clutching action in response to substantially synchronized rotation thereof at or above a predetermined speed, means for driving one of said structures from said driving shaft and at the same speed as that of said driving shaft, and means including a countershaft gear train for driving the other of said structures from said driven shaft and at a speed less than that of said driving shaft, said driving means being adapted to drive said structures at said relatively different speeds when said driving shaft drives said driven shaft through said direct drive releasable clutching means, said clutching structures being adapted to establish a positive overdrive from said driving shaft to said driven shaft through said driving means subsequently to release of said releasable clutching means and in response to reducing the rotational speed of the driving shaft to effect approximate synchronized rotation of said clutching structures.

EDWIN R. MAURER.
JOHN H. COYNE.